US011952941B2

(12) United States Patent
Matsukuma

(10) Patent No.: US 11,952,941 B2
(45) Date of Patent: Apr. 9, 2024

(54) COMPRESSED AIR ENERGY STORAGE POWER GENERATION DEVICE

(71) Applicant: KABUSHIKI KAISHA KOBE SEIKO SHO (KOBE STEEL, LTD.), Hyogo (JP)

(72) Inventor: Masaki Matsukuma, Takasago (JP)

(73) Assignee: KOBE STEEL, LTD., Hyogo (JP)

( * ) Notice: Subject to any disclaimer, the term of this patent is extended or adjusted under 35 U.S.C. 154(b) by 282 days.

(21) Appl. No.: 17/608,697

(22) PCT Filed: Mar. 24, 2020

(86) PCT No.: PCT/JP2020/013062
§ 371 (c)(1),
(2) Date: Nov. 3, 2021

(87) PCT Pub. No.: WO2020/230455
PCT Pub. Date: Nov. 19, 2020

(65) Prior Publication Data
US 2022/0220894 A1  Jul. 14, 2022

(30) Foreign Application Priority Data

May 10, 2019  (JP) ................................ 2019-089865

(51) Int. Cl.
*F02C 6/16* (2006.01)
*F02C 1/02* (2006.01)
*F02C 7/28* (2006.01)

(52) U.S. Cl.
CPC ................. *F02C 6/16* (2013.01); *F02C 1/02* (2013.01); *F02C 7/28* (2013.01)

(58) Field of Classification Search
CPC .................................. Y02E 60/16; F02C 6/16
See application file for complete search history.

(56) References Cited

U.S. PATENT DOCUMENTS 10,995,665 B2    5/2021  Toshima et al.
2011/0100010 A1  5/2011  Freund et al.
(Continued)

FOREIGN PATENT DOCUMENTS

JP    51113056 A   * 10/1976
JP    S51-113056 A   10/1976
(Continued)

OTHER PUBLICATIONS

English translation of Kubo (JP2018184907) (Year: 2023).*
(Continued)

*Primary Examiner* — Thomas E Lazo
(74) *Attorney, Agent, or Firm* — Studebaker & Brackett PC

(57) ABSTRACT

A CAES power generation device includes: a compressor/expander combined machine that is of displacement type and has a function as a compressor for compressing air and a function as an expander for expanding compressed air; a motor/generator combined machine that is mechanically connected to the compressor/expander combined machine and has a function as an electric motor for driving the compressor/expander combined machine and a function as a generator driven by the compressor/expander combined machine; and a pressure accumulation tank that is fluidly connected to the compressor/expander combined machine and stores compressed air generated by the compressor/expander combined machine.

8 Claims, 9 Drawing Sheets

(56) References Cited

U.S. PATENT DOCUMENTS

| | | | | |
|---|---|---|---|---|
| 2013/0240068 | A1* | 9/2013 | Samara-Rubio | H02J 15/006 |
| | | | | 137/571 |
| 2018/0266315 | A1* | 9/2018 | Kubo | F28F 27/02 |
| 2018/0283275 | A1* | 10/2018 | Matsukuma | F02C 6/00 |
| 2018/0347459 | A1* | 12/2018 | Matsukuma | F02C 7/185 |
| 2019/0056152 | A1* | 2/2019 | Matsukuma | F02C 6/00 |
| 2019/0072185 | A1 | 3/2019 | Morinaka | |
| 2020/0131989 | A1 | 4/2020 | Toshima et al. | |

FOREIGN PATENT DOCUMENTS

| | | | | |
|---|---|---|---|---|
| JP | S62-272064 A | | 11/1987 | |
| JP | S62272064 A | * | 11/1987 | |
| JP | 2016-211515 A | | 12/2016 | |
| JP | 2016211515 A | * | 12/2016 | |
| JP | 2018184907 A | * | 11/2018 | F02C 6/16 |
| JP | 2019-049346 A | | 3/2019 | |
| WO | 20150198901 A1 | | 12/2015 | |
| WO | WO-2015198901 A1 | * | 12/2015 | B01J 2/22 |

OTHER PUBLICATIONS

Notification of Transmittal of Translation of the International Preliminary Report on Patentability and Translation of Written Opinion of the International Searching Authority; PCT/JP2020/013062; dated Nov. 25, 2021.

* cited by examiner

COMPRESSED AIR ENERGY STORAGE POWER GENERATION DEVICE

CROSS-REFERENCE TO RELATED APPLICATIONS

This is a national phase application in the United States of International Patent Application No. PCT/JP2020/013062 with an international filing date of Mar. 24, 2020, which claims priority of Japanese Patent Application No. 2019-089865 filed on May 10, 2019 the contents of which are incorporated herein by reference.

TECHNICAL FIELD

The present invention relates to a compressed air energy storage power generation device.

BACKGROUND ART

As one of the techniques for smoothing or leveling fluctuating unstable power generation outputs, compressed air energy storage (CAES) is known. In a compressed air energy storage power generation device using this technique, surplus power, occurring when the power generated by a generator is surplus, is supplied to an electric motor. Then, a compressor is driven by the electric motor to generate compressed air. The generated compressed air is temporarily stored. Then, the generator is driven when necessary by operating an expander (turbine) with the compressed air stored to reconvert into electricity.

JP 2013-509530 A describes an adiabatic compressed air energy storage (ACAES) power generation device that recovers heat from compressed air before the compressed air is stored and reheats the stored compressed air when it is supplied to a turbine. Since the ACAES power generation device recovers compression heat to use it when power is generated, it has higher power generation efficiency than a normal CAES power generation device. Hereinafter, the ACAES power generation device and the CAES power generation device are also simply referred to as a CAES power generation device without distinguishing them from each other.

SUMMARY OF THE INVENTION

In the CAES power generation device of JP 2013-509530 A, a compressor and an expander are separately configured, so that the entire device is increased in size and cost.

An object of the present invention is to reduce the size and cost of a CAES power generation device by integrating a compressor and an expander.

According to a first aspect of the present invention, there is provided a compressed air energy storage power generation device including: a compressor/expander combined machine that is of displacement type and has a function as a compressor for compressing air and a function as an expander for expanding compressed air; a motor/generator combined machine that is mechanically connected to the compressor/expander combined machine and has a function as an electric motor for driving the compressor/expander combined machine and a function as a generator driven by the compressor/expander combined machine; and a pressure accumulator that is fluidly connected to the compressor/expander combined machine and stores compressed air generated by the compressor/expander combined machine.

According to this configuration, the compressor/expander combined machine in which a compressor and an expander are integrated is used in the compressed air energy storage power generation device, so that the entire device can be reduced in size. In addition, the number of parts to be maintained can be reduced, so that maintenance cost can be reduced. Cost for various construction including piping construction can be reduced, and an installation space can be reduced. Therefore, cost can be reduced.

The compressor/expander combined machine includes a first casing that defines a compression chamber and is provided with a first through hole, a first rotating shaft member that is inserted through the first through hole, and a first seal part that seals a gap between the first rotating shaft member and the first casing in the first through hole, in which the first seal part may include a lubricant labyrinth seal having a rotationally axisymmetric shape so as not to depend on a rotation direction of the first rotating shaft member.

According to this configuration, a fluid other than air, such as a lubricant, existing outside the compression chamber, can be suppressed from entering the compression chamber in the compressor/expander combined machine. In the compressor/expander combined machine, the first rotating shaft member rotates in both directions, not in one direction. That is, a direction in which the first rotating shaft member rotates when the compressor/expander combined machine functions as a compressor is different from a direction in which the first rotating shaft member rotates when the compressor/expander combined machine functions as an expander. When these functions are switched, the first rotating shaft member is reversed. Therefore, a shaft seal structure of the compressor/expander combined machine is required to be designed to not depend on the rotation direction. If a first seal part of a screw groove type (i.e., a spiral type) depending on the rotation direction is provided, an airflow going from the outside of the compression chamber toward the compression chamber may be caused in the first through hole depending on the rotation direction. In the above configuration, a lubricant labyrinth seal having a rotationally axisymmetric shape is adopted as the first seal part so as not to depend on the rotation direction of the first rotating shaft member, so that occurrence of the airflow can be suppressed.

The first seal part further includes an air ring seal disposed, in a direction in which the first rotating shaft member extends, closer to the compression chamber than the lubricant labyrinth seal. The compressor/expander combined machine may further include: a first inlet that is provided in the first casing and introduces compressed air into the lubricant labyrinth seal; and a first air source that is fluidly connected to the first inlet and supplies compressed air to the lubricant labyrinth seal from the compression chamber side via the first inlet.

According to this configuration, the lubricant labyrinth seal using the compressed air supplied from the first air source via the first inlet can suppress the lubricant entering the compression chamber, so that a sealing property can be enhanced without depending on the rotation direction of the first rotating shaft member. In addition, two or more of the air ring seals can suppress the compressed air introduced from the first air source via the first inlet from entering the compression chamber, so that the sealing property can be further enhanced.

The motor/generator combined machine includes a second casing that defines a coil chamber and is provided with a second through hole, a second rotating shaft member that is inserted through the second through hole, and a second seal part that seals a gap between the second rotating shaft member and the second casing in the second through hole, in which the second seal part may have a rotationally axisymmetric shape so as not to depend on a rotation direction of the second rotating shaft member.

According to this configuration, a fluid other than air, such as a lubricant, existing outside the coil chamber, can be suppressed from entering the coil chamber in the motor/generator combined machine. In the motor/generator combined machine, the second rotating shaft member rotates in both directions, not in one direction. That is, a direction in which the second rotating shaft member rotates when the motor/generator combined machine functions as an electric motor is different from a direction in which the second rotating shaft member rotates when the motor/generator combined machine functions as a generator. When these functions are switched, the second rotating shaft member is reversed. Therefore, a shaft seal structure of the motor/generator combined machine is required to be designed to not depend on the rotation direction. If a second seal part of a screw groove type (i.e., a spiral type) depending on the rotation direction is provided, an airflow going from the outside of the coil chamber toward the coil chamber may be caused in the second through hole depending on the rotation direction. In the above configuration, a rotationally axisymmetric shape is adopted as the second seal part so as not to depend on the rotation direction of the second rotating shaft member, so that occurrence of the airflow can be suppressed.

The motor/generator combined machine may further include a second inlet that is provided in the second casing and introduces compressed air into the coil chamber, and a second air source that is fluidly connected to the second inlet and supplies compressed air into the coil chamber from the second inlet.

According to this configuration, the pressure of the coil chamber can be increased by supplying compressed air to the coil chamber from the second air source via the second inlet. Since the coil chamber has a higher pressure than the surroundings, a fluid other than air, such as a lubricant, can be suppressed from entering the coil chamber.

The compressed air energy storage power generation device may further include: an inflow path having a check valve that is disposed to allow air to flow only in an inflow direction into the compressor/expander combined machine; and a discharge path having a check valve that is disposed to allow air to flow only in a discharge direction from the compressor/expander combined machine.

According to this configuration, the flow directions of air can be mechanically switched without performing electromagnetic control. In the compressor/expander combined machine, the flow directions of air are opposite between when it operates as a compressor and when it operates as an expander. If an electromagnetic control part, such as a three-way solenoid valve, capable of switching flow directions, is used, the flow directions can be switched by electromagnetic control, but a structure and associated control become complicated. On the other hand, in the above configuration, mechanical simple switching of the flow directions of air that does not require electromagnetic control is realized by providing two routes (inflow path, discharge path) in each of which an inflow direction is defined.

The compressed air energy storage power generation device may further include: a heat exchange part that is disposed on a high-pressure side of the compressor/expander combined machine and has a function of exchanging heat between the compressed air generated by the compressor/expander combined machine and a heat medium to heat the heat medium and cool the compressed air, and a function of exchanging heat between the compressed air supplied to the compressor/expander combined machine and the heat medium to cool the heat medium and heat the compressed air; a high-temperature heat storage part that is fluidly connected to the heat exchange part and stores the heat medium heated by the heat exchange part; a low-temperature heat storage part that is fluidly connected to the heat exchange part and stores the heat medium cooled by the heat exchange part; and a pressure equalizing part that equalizes pressures of the high-temperature heat storage part and the low-temperature heat storage part.

According to this configuration, heat can be recovered from the compressed air, heated by the compression heat during compression, by the heat medium in the heat exchange part, and the heat can be stored in the high-temperature heat storage part as thermal energy. When the high-temperature heat medium stored in the high-temperature heat storage part supplies heat to the heat exchange part during expansion, the heat is given from the heat medium to the compressed air before expansion, which enables expansion efficiency to be improved.

The heat medium is water, and the pressure equalizing part may include a flow path that fluidly connects the high-temperature heat storage part and the low-temperature heat storage part, and an inert gas source that is fluidly connected to the high-temperature heat storage part and the low-temperature heat storage part and supplies an inert gas at a predetermined pressure to the high-temperature heat storage part and the low-temperature heat storage part.

According to this configuration, the flow of the heat medium can be stabilized by equalizing the pressures of the heat media in the high-temperature heat storage part and the low-temperature heat storage part. In particular, water is used as the heat medium, so that a compressed air energy storage power generation device excellent in environmental properties can be manufactured at low cost. However, when the heat medium is water, the heat medium boils at 100° C. or higher under atmospheric pressure, so that in order to suppress the boiling of the water, an inert gas at a predetermined pressure is supplied from the inert gas source. That is, the predetermined pressure here indicates a degree of pressure that can suppress boiling of water.

The compressor/expander combined machine may further include a pinion that is for transmitting rotational driving force with the motor/generator combined machine, and an anti-loosening nut that holds the pinion so as not to loosen.

According to this configuration, the pinion can be suppressed from loosening by the anti-loosening nut. The anti-loosening nut has a function of not loosening by a wedge effect even when the first rotating shaft member rotates forward and backward.

The compressor/expander combined machine may further include a pinion that is for transmitting rotational driving force with the motor/generator combined machine, a plurality of bolts that hold the pinion, pressing lids that press the plurality of bolts, and an anti-loosening nut that fixes the pressing lid.

According to this configuration, the pressing lids for pressing the plurality of bolt are fixed by the anti-loosening nut, so that the pressing lids can be suppressed from loosening and the plurality of bolts can be suppressed from loosening. Therefore, the pinion can be suppressed from loosening.

According to the present invention, a compressor/expander combined machine in which a compressor and an expander are integrated is used in a compressed air energy storage power generation device, so that the entire device can be reduced in size and reduced in cost.

MODE FOR CARRYING OUT THE INVENTION

Hereinafter, embodiments of the present invention will be described with reference to the accompanying drawings.

First Embodiment

Figure 1:
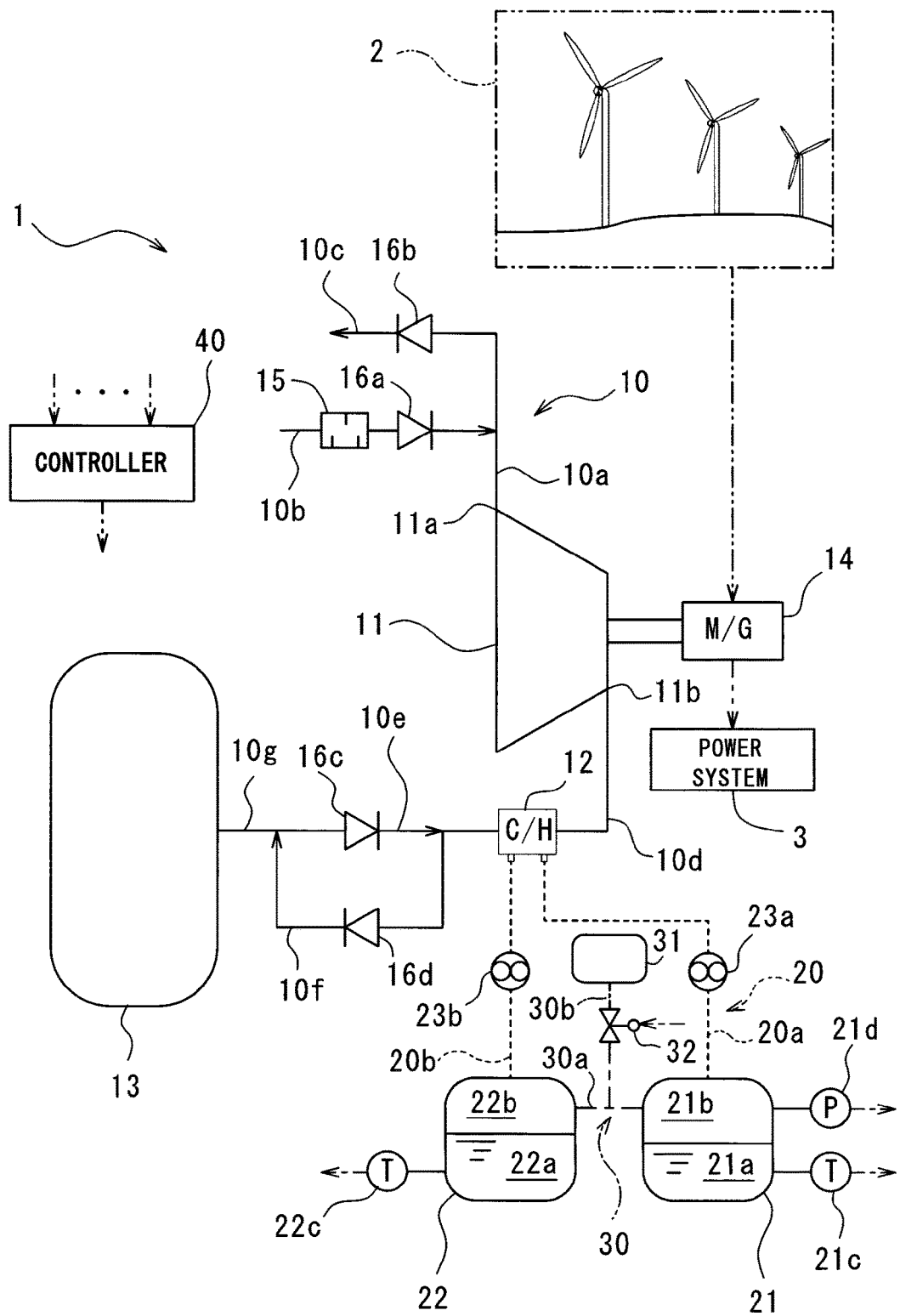
FIG. 1 is a schematic configuration view of a compressed air energy storage power generation device according to a first embodiment of the present invention.

With reference to FIG. 1, a compressed air energy storage (CAES) power generation device 1 supplies power to a power system 3 by leveling output fluctuations of a power generation facility 2 that generates power by using renewable energy, and supplies power corresponding to fluctuations in power demand to the power system 3.

In the present embodiment, the power generation facility 2 that generates power by using renewable energy is exemplified by a wind power generation facility. However, the type of the renewable energy is not limited to this, and all of power generation, using energy that is steadily or repeatedly replenished by natural force and fluctuates irregularly, such as sunlight, solar heat, wave force, tidal force, flowing water, or tide, can be targeted. Furthermore, in addition to the renewable energy, all of what fluctuate in amount of power generation, such as a factory having a power generation facility that operates irregularly, can be targeted.

The CAES power generation device 1 of the present embodiment includes an air flow path system 10, a heat medium flow path system 20, and an inert gas flow path system 30.

(Air Flow Path System)

The air flow path system 10 is provided with a compressor/expander combined machine 11, a heat exchanger (heat exchange part) 12, and a pressure accumulation tank (pressure accumulator) 13. The air flow path system 10 includes air flow paths 10a to 10g.

A motor/generator combined machine 14 is mechanically connected to the compressor/expander combined machine 11. The motor/generator combined machine 14 has a function as an electric motor that drives the compressor/expander combined machine 11 and a function as a generator that is driven by the compressor/expander combined machine 11. The power generation facility 2 is electrically connected to the motor/generator combined machine 14. The motor/generator combined machine 14 is driven by fluctuating input power from the power generation facility 2. In addition, the motor/generator combined machine 14 is electrically connected to the power system 3. The power generated by the motor/generator combined machine 14 can be transmitted to the power system 3. Details of the structure of the motor/generator combined machine 14 will be described later.

The air flow path 10a is fluidly connected to a low-pressure port 11a of the compressor/expander combined machine 11. The air flow path 10a is branched into the air flow path (inflow path) 10b for intake and the air flow path (outflow path) 10c for exhaust. The ends of the air flow paths 10b and 10c are open to the atmosphere. The air flow path 10b is provided with a silencer 15 that reduces intake sound, and a check valve 16a that allows air to flow only in an intake direction (an inflow direction into the low-pressure port 11a of the compressor/expander combined machine 11) and blocks air in the opposite direction. The air flow path is provided with a check valve 16b that allows air to flow only in an exhaust direction (a discharge direction from the low-pressure port 11a of the compressor/expander combined machine 11) and blocks air in the opposite direction.

The air flow path 10d is fluidly connected to a high-pressure port 11b of the compressor/expander combined machine 11. The air flow path 10d is branched into the air flow path (inflow path) 10e to which compressed air is supplied from a pressure accumulation tank 13 and the air flow path (outflow path) 10f for supplying compressed air to the pressure accumulation tank 13. They are joined at the air flow path 10g. The air flow path 10g is fluidly connected to the pressure accumulation tank 13. The air flow path 10e is provided with a check valve 16c that allows air to flow only in an air supply direction to the compressor/expander combined machine 11 (an inflow direction to the high-pressure port 11b of the compressor/expander combined machine 11) and blocks air in the opposite direction. The air flow path 10f is provided with a check valve 16d that allows a flow in a pressure feeding direction to the pressure accumulation tank 13 (a discharge direction from the high-pressure port 11b of the compressor/expander combined machine 11) and blocks a flow in the opposite direction.

The compressor/expander combined machine 11 of the present embodiment is a screw type. Since the compressor/expander combined machine 11 of a screw type is speed controllable, it can follow irregularly-fluctuating input power from the power generation facility 2 with good responsiveness. Therefore, it is preferable as a constituent of the CAES power generation device 1. However, the compressor/expander combined machine 11 only needs to be of a displacement type, and may be, for example, a scroll type or a reciprocating type in addition to the screw type. In addition, the compressor/expander combined machine 11 may be a single-stage type or a multi-stage type. Details of the structure of the compressor/expander combined machine 11 will be described later.

The pressure accumulation tank 13 can store compressed air and accumulate it as energy. The pressure accumulation tank 13 can be, for example, a tank made of steel. The number of the pressure accumulation tanks 13 is not particularly limited, and a plurality of them may be provided. In addition, the pressure accumulation tank 13 may not necessarily be in the form of a tank. Alternatively, it only needs to be in a form that can store compressed air, such as an underground cavity.

A heat exchanger 12 is interposed in the air flow path 10d fluidly connected to the high-pressure port 11b of the compressor/expander combined machine 11. Details of the heat exchange in the heat exchanger 12 will be described later.

(Heat Medium Flow Path System)

The heat medium flow path system 20 is provided with the heat exchanger 12, a high-temperature heat medium tank (high-temperature heat storage part) 21, and a low-temperature heat medium tank (low-temperature heat storage part) 22. The heat medium flow path system 20 includes heat medium flow paths 20a and 20b. A pump 23a is disposed in the heat medium flow path 20a, the pump 23a allowing the heat medium to flow between the heat exchanger 12 and the high-temperature heat medium tank 21. Similarly, a pump 23b is disposed in the heat medium flow path 20b, the pump 23b allowing the heat medium to flow between the heat exchanger and the low-temperature heat medium tank 22. In the present embodiment, water is used as the heat medium. The type of the heat medium is not particularly limited, and for example, a mineral oil-based, glycol-based, or synthetic oil-based heat medium may be used.

Inside the high-temperature heat medium tank 21, there are a portion (liquid phase part 21a) in which the heat medium is stored and a gas phase part 21b in which the heat medium is not stored and which is filled with N2 gas (inert gas). Similarly, inside the low-temperature heat medium tank 22, there are a liquid phase part 22a in which the heat medium is stored and a gas phase part 22b filled with N2 gas.

In the heat exchanger 12, the compressed air generated by the compressor/expander combined machine 11 and the heat medium from the low-temperature heat medium tank 22 exchange heat with each other, so that the heat medium is heated and the compressed air is cooled. In addition, in the heat exchanger 12, the compressed air supplied to the compressor/expander combined machine 11 and the heat medium from the high-temperature heat medium tank 21 exchange heat with each other, so that the heat medium is cooled and the compressed air is heated.

The high-temperature heat medium tank 21 is a tank made of, for example, steel, and is preferably insulated from the outside. The high-temperature heat medium tank 21 stores the heat medium heated by the heat exchanger 12. Therefore, the heat medium in the high-temperature heat medium tank 21 and the heat medium flow path 20a is at a high temperature in the heat medium flow path system 20. In the high-temperature heat medium tank 21, a temperature sensor 21c for measuring the temperature of the internal liquid phase part 21a and a pressure sensor 21d for measuring the pressure of the internal gas phase part 21b are installed.

The low-temperature heat medium tank 22 is a tank made of, for example, steel. The low-temperature heat medium tank 22 stores the heat medium cooled by the heat exchanger 12. Therefore, the heat medium in the low-temperature heat medium tank 22 and the heat medium flow path 20b is at a low temperature in the heat medium flow path system 20. In the low-temperature heat medium tank 22, a temperature sensor 22c for measuring the temperature of the internal liquid phase part 22a is installed. Note that the pressure of the gas phase part 22b of the low-temperature heat medium tank 22 matches the pressure of the gas phase part 21b of the high-temperature heat medium tank 21, as described later.

(Inert Gas Flow Path System)

The inert gas flow path system 30 includes the gas phase part 21b of the high-temperature heat medium tank 21, the gas phase part 22b of the low-temperature heat medium tank 22, and an N2 cylinder (inert gas source) 31. The inert gas flow path system 30 includes inert gas flow paths 30a and 30b.

The inert gas flow path 30a is a flow path that fluidly connects the gas phase part 21b of the high-temperature heat medium tank 21 and the gas phase part 22b of the low-temperature heat medium tank 22 so as to equalize the pressures. The inert gas flow path 30b extending to the N2 cylinder 31 is fluidly connected to the inert gas flow path 30a. The inert gas flow path system 30 is filled with N2 gas supplied from the N2 cylinder 31. Note that in the present embodiment, N2 gas is used as the inert gas, but the type of the inert gas is not limited thereto, and for example, Ar gas may be used.

In the present embodiment, the inert gas flow paths 30a and 30b and the N2 cylinder 31 constitute a pressure equalizing part of the present invention. The pressure equalizing part equalizes the pressures of the high-temperature heat medium tank 21 and the low-temperature heat medium tank 22.

The pressure of the N2 gas supplied from the N2 cylinder 31 can be adjusted by a pressure regulating valve 32 interposed in the inert gas flow path 30b. The aperture of the pressure regulating valve 32 is controlled by a controller 40.

The controller 40 can be built by hardware including a central processing unit (CPU) and storage devices such as a random access memory (RAM) and a read only memory (ROM), and by software mounted on the hardware.

Based on the pressure value measured by the pressure sensor 21d and the temperature values measured by the temperature sensors 21c and 22c, the controller 40 controls the pressure regulating valve 32 to regulate pressure such that the heat media in the high-temperature heat medium tank and the low-temperature heat medium tank 22 do not vaporize, that is, water does not boil in the present embodiment.

(Structure of Compressor/Expander Combined Machine)

Figure 2:
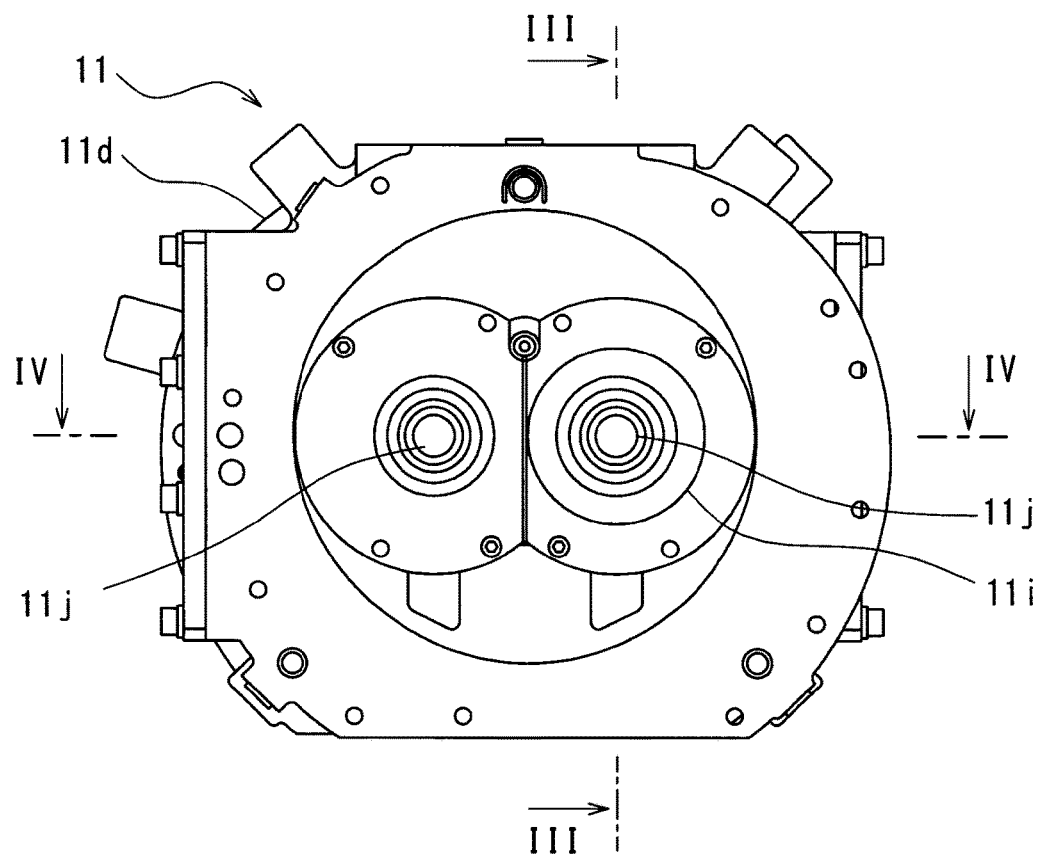
FIG. 2 is a front view of a compressor/expander combined machine.
Figure 3:
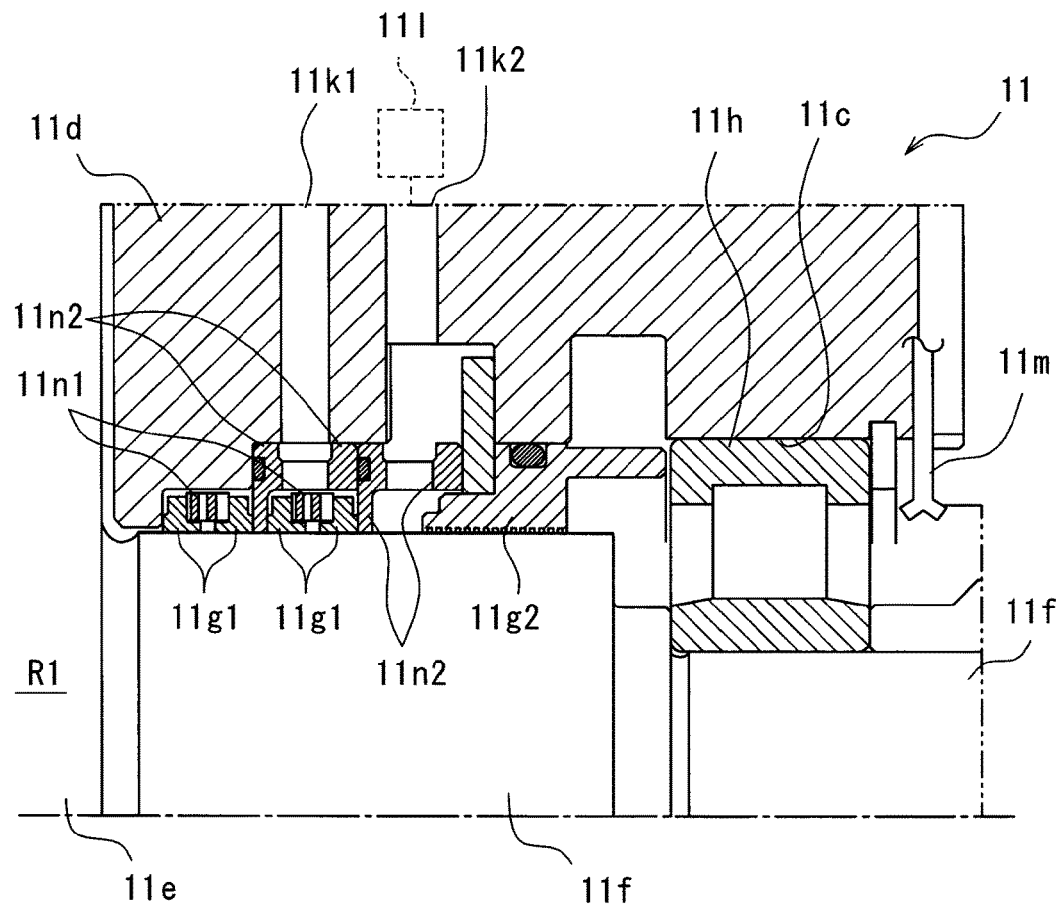
FIG. 3 is a partial cross-sectional view of a vicinity of a bearing, taken along line III-III of FIG. 2.
Figure 4:
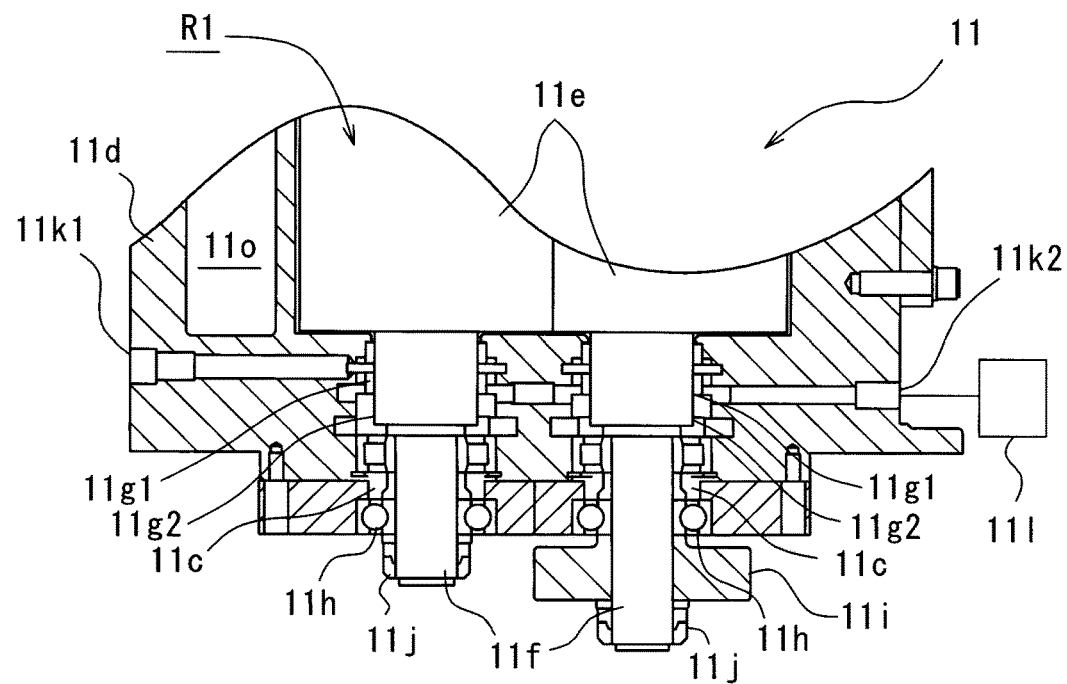
FIG. 4 is a partial cross-sectional view of the vicinity of the bearing, taken along line IV-IV of FIG. 2.

With reference to FIGS. 2 to 4, the compressor/expander combined machine 11 includes a casing (first casing) 11d that defines a compression chamber R1 and is provided with a through hole (first through hole) 11c. In the compression chamber R1, a pair of male and female screw rotors 11e are disposed. The screw rotor 11e is supported by a rotating shaft member (first rotating shaft member) 11f. The rotating shaft member 11f extends, through the through hole 11c, from the inside to the outside of the casing 11d. In the through hole 11c, four air ring seals 11g1 (first seal parts) for sealing a gap between the rotating shaft member 11f and the casing 11d and one lubricant labyrinth seal (first seal part) 11g2 are disposed.

The air ring seals 11g1 are disposed, in a direction in which the rotating shaft member 11f extends, closer to the compression chamber R1 than the lubricant labyrinth seal 11g2. The four air ring seals 11g1 are floating seals that are biased, by weak wave springs 11n1, in the direction in which the rotating shaft member 11f extends while maintaining a minimum gap with the rotating shaft member 11f and the positions of which are held by being pressed against fixed parts. The fixed parts against which the air ring seals 11g1 are pressed are the casing 11d or a plurality of spacers 11n2 disposed to fill gaps between the casing 11d and the air ring seals 11g1. The air ring seal 11g1 is a component that exerts a sealing function using the pressure of air by holding the minimum gap with the rotating shaft member 11f.

The lubricant labyrinth seal 11g2 has a rotationally axisymmetric shape so as not to depend on the rotation direction of the rotating shaft member 11f. In other words, a screw seal of a spiral groove type, depending on the rotation direction of the rotating shaft member 11f, is not adopted as the lubricant labyrinth seal 11g2. The lubricant labyrinth seal 11g2 may be what has, for example, straight grooves, as illustrated in FIG. 3. Note that the structure on the low-pressure port 11a (see FIG. 1) side is only illustrated in FIG. 3, but the structure on the high-pressure port 11b (see FIG. 1) side is also substantially the same.

With reference to FIGS. 3 and 4, a bearing 11h is disposed, in the direction in which the rotating shaft member 11f extends, next to the lubricant labyrinth seal 11g2 (on the opposite side to the compression chamber R1). The bearing 11h rotatably supports the rotating shaft member 11f. A pinion 11i is disposed next to the bearing 11h (on the opposite side to the compression chamber R1). The pinion 11i is rotatably held by an anti-loosening nut 11j so as not to loosen from the rotating shaft member 11f that supports the male screw rotor 11e. The anti-loosening nut 11j is a nut whose loosening is suppressed by a wedge effect, and a publicly known anti-loosening nut can be used. Note that in the present embodiment, substantially the same structure is adopted also for the rotating shaft member 11f that supports the female screw rotor 11e except for the presence or absence of the pinion 11i.

The casing 11d is provided with a vent 11k1 fluidly connected to a space between the third and fourth seals (counted from the compression chamber R1 side) of the air ring seals 11g1, and an inlet (first inlet) 11k2 for introducing compressed air into the air ring seals 11g1 and the lubricant labyrinth seal 11g2. The vent 11k1 is open to the atmosphere. The inlet 11k2 is fluidly connected to a space between the air ring seals 11g1 and the lubricant labyrinth seal 11g2. An air source (first air source) 11l is fluidly connected to the inlet 11k2, and compressed air is supplied to the lubricant labyrinth seal 11g2 from the compression chamber R1 via the inlet 11k2. The air source 11l supplies compressed air of, for example, about 10 KPaG.

The flow of air in the air ring seals 11g1 can change depending on the operation of the compressor/expander combined machine 11. Details of the flow of air in the air ring seals 11g1 are as follows.

When the compressor/expander combined machine 11 operates as a compressor and performs normal load operation, the low-pressure port 11a (see FIG. 1) has a slightly negative or positive pressure. Therefore, in the air ring seals 11g1, air tends to flow from the compression chamber R1 toward the bearing 11h (right direction in FIG. 3). Since the vent 11k1 is open to the atmosphere, the air tending to flow from the compression chamber R1 toward the bearing 11h passes through the three air ring seals 11g1, and is discharged into the atmosphere from the vent 11k1. When passing through the air ring seals 11g1, the air flows through the minimum gap between the air ring seals 11g1 and the rotating shaft member 11f. A part of the compressed air introduced from the inlet 11k2 flows from the inlet 11k2 toward the bearing 11h, and a part thereof passes through the fourth air ring seal 11g1 to be discharged from the vent 11k1. In this way, the flow of air from the compression chamber R1 toward the bearing 11h is generated, so that a lubricant that has lubricated the bearing 11h and the like is prevented from flowing into the compression chamber R1 beyond the lubricant labyrinth seal 11g2 and the air ring seals 11g1.

When the compressor/expander combined machine 11 operates as a compressor and performs no-load operation, the low-pressure port 11a (see FIG. 1) has a negative pressure. Therefore, in the air ring seals high, air tends to flow from the bearing 11h toward the compression chamber R1 (left direction in FIG. 3). Since the vent 11k1 is open to the atmosphere, air flows in from the vent 11k1, passes through the space between the third and fourth seals of the air ring seals 11g1, and flows into the compression chamber R1. In addition, a part of the compressed air introduced from the inlet 11k2 flows toward the bearing 11h, and a part thereof tends to flow toward the vent 11k1. Therefore, in the vent 11k1, air flows in or is discharged according to the pressure of the low-pressure port 11a and the pressure of the compressed air introduced from the inlet 11k2. In either case, a part of the compressed air introduced from the inlet 11k2 flows toward the bearing 11h, so that the lubricant that has lubricated the bearing 11h and the like is prevented from flowing into the compression chamber R1 beyond the lubricant labyrinth seal 11g2 and the four air ring seals 11g1.

When the compressor/expander combined machine 11 operates as an expander, the low-pressure port does not have a negative pressure. Therefore, the flow of air, generated when the compressor/expander combined machine 11 operates as an expander, is the same as the flow of air generated when the compressor/expander combined machine 11 operates as a compressor and performs normal load operation.

Note that the high-pressure port 11b (see FIG. 1) does not have a negative pressure even when the compressor/expander combined machine 11 performs any of the operations described above. Therefore, the flow of air on the side of the non-illustrated high-pressure port 11b is the same as the flow of air on the side of the low-pressure port 11a when the compressor/expander combined machine 11 operates as a compressor and performs normal load operation.

The casing 11d is provided with an injection nozzle 11m capable of supplying a lubricant to the bearing 11h. The lubricant injected from the injection nozzle 11m to the bearing 11h is blocked from flowing into the compression chamber R1 by the lubricant labyrinth seal 11g2 and the air ring seals, so that it is discharged from a non-illustrated return hole to be returned to a non-illustrated lubricant tank.

In the casing 11d, a cooling water flow path 11o (see FIG. 4) is embedded. It is configured that the compression chamber R1 can be cooled by allowing water at a low temperature to flow through the cooling water flow path 11o. The flow rate of the water flowing through the cooling water flow path 11o is controlled by the controller 40 such that during compression operation (charging operation), a necessary amount of cold water is allowed to pass, and during expansion operation (power generation operation), the water supply is stopped or an extremely small amount of water is allowed to pass.

(Structure of Motor/Generator Combined Machine)

Figure 5:
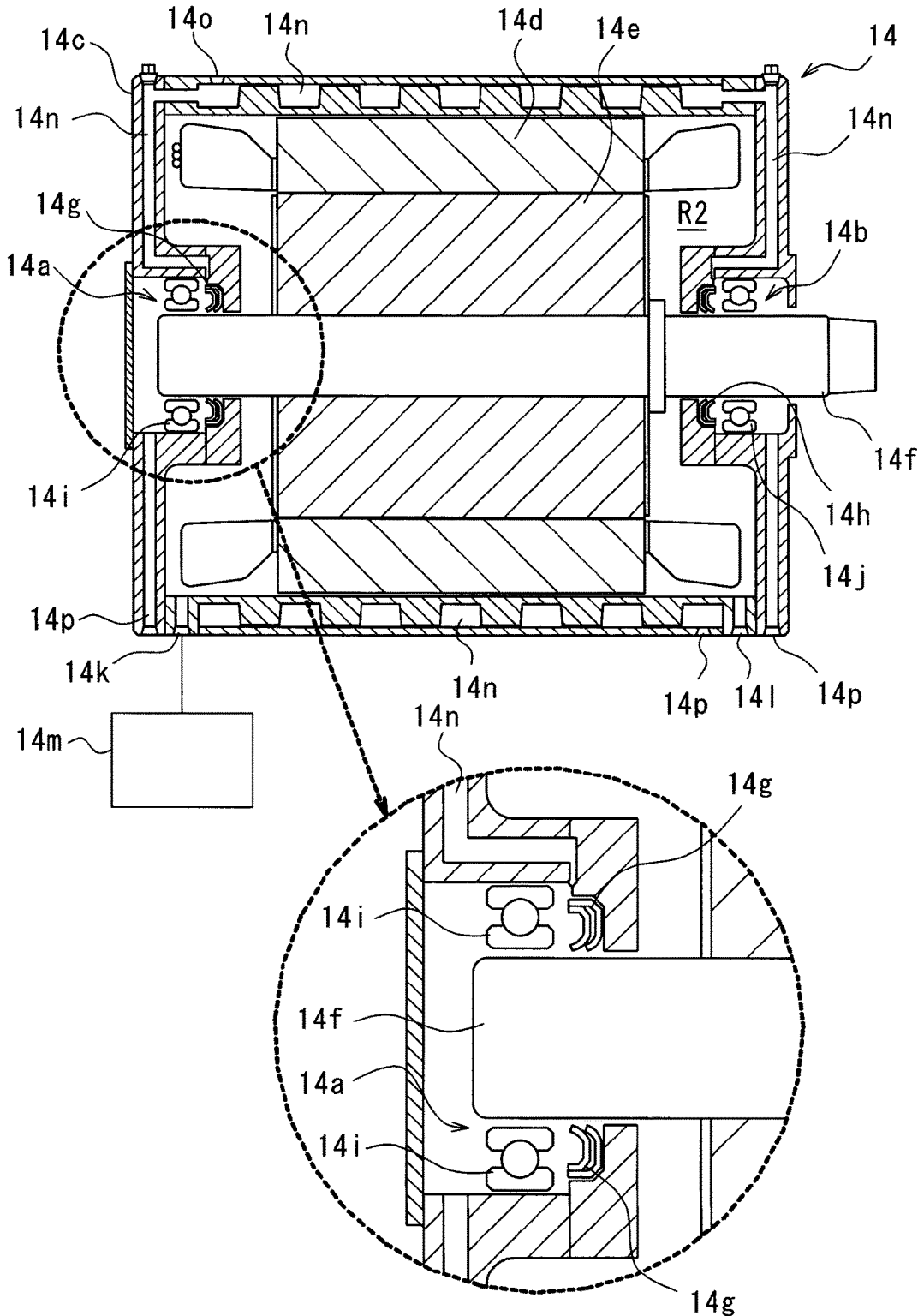
FIG. 5 is a cross-sectional view illustrating a shaft seal structure of a motor/generator combined machine.

With reference to FIG. 5, the motor/generator combined machine 14 has a casing (second casing) 14c that defines a coil chamber R2 and is provided with through holes (second through holes) 14a and 14b. Note that in FIG. 5, an enlarged dashed circle portion is illustrated. A stator 14d and a rotor 14e are disposed in the coil chamber R2. The stator 14d is fixed to the inner surface of the casing 14c. The rotor 14e is disposed inside the stator 14d. The rotor 14e is supported by a rotating shaft member (second rotating shaft member) 14f. The rotating shaft member 14f extends, through the through holes 14a and 14b, from the inside to the outside of the casing 14c. Lip seals (second seal parts) 14g and 14h each sealing a gap between the rotating shaft member 14f and the casing 14c are disposed in the through holes 14a and 14b, respectively.

The lip seals 14g and 14h have a rotationally axisymmetric shape so as not to depend on the rotation direction of the rotating shaft member 14f. In other words, a spiral groove type contact seal with inner screw grooves, depending on the rotation direction of the rotating shaft member 14f, or a non-contact screw seal is not adopted as the lip seals 14g and 14h. The lip seals 14g and 14h may be, for example, contact type seals without inner grooves that do not depend on the rotation direction of the rotating shaft member 14f. Alternatively, labyrinth seals having straight grooves of a non-contact type, not depend on the rotation direction of the rotating shaft member 14f, may be adopted.

Bearings 14i and 14j are disposed next to the lip seals 14g and 14h, respectively. The bearings 14i and 14j rotatably support the rotating shaft member 14f on both sides of the bearings 14i and 14j by sandwiching the stator 14d and the rotor 14e. A gear (not illustrated) is attached to the rotating shaft member 14f of the motor/generator combined machine 14. This gear meshes with the pinion 11i attached to the rotating shaft member 14f of the compressor/expander combined machine 11. Therefore, rotational driving force can be transmitted between the motor/generator combined machine 14 and the compressor/expander combined machine 11.

The casing 14c is provided with an inlet (second inlet) 14k for introducing compressed air into the coil chamber R2 and an outlet 14l for discharging compressed air from the coil chamber R2. An air source (second air source) 14m for supplying compressed air to the coil chamber R2 from the inlet 14k is fluidly connected to the inlet 14k. The air source 14m supplies air having a degree of pressure that can keep the coil chamber R2 at a higher pressure than the surroundings. As a result, a lubricant or the like can be suppressed from flowing into the coil chamber R2. Therefore, in the present embodiment, an air seal is also adopted in the motor/generator combined machine 14.

In the casing 14c, a lubricant flow path 14n for supplying a lubricant to the bearings 14i and 14j is embedded. The lubricant flow path 14n is spirally routed in the casing 14c from an entrance 14o to an exit 14p. As a result, the coil chamber R2 can be cooled by allowing a lubricant at a low temperature to flow through the lubricant flow path. Such a cooling mechanism can exhibit constant cooling performance regardless of the rotational driving direction and rotation speed of the motor/generator combined machine 14, so that it is particularly effective for the motor/generator combined machine 14. In addition, the bearings 14i and 14j are disposed in the middle of the lubricant flow path 14n, so that the bearings 14i and 14j can be lubricated.

(Operation and Effect)

With reference to FIG. 1, when the CAES power generation device 1 performs charging operation, the motor/generator combined machine 14 is driven as an electric motor (motor) by the fluctuating power input from the power generation facility 2, and the compressor/expander combined machine 11 is driven as a compressor by the motor/generator combined machine 14. The compressor/expander combined machine 11 sucks, from the low-pressure port 11a, the air supplied via the air flow paths 10a and 10b, and compresses the air to generate compressed air. The compressed air discharged from the high-pressure port 11b of the compressor/expander combined machine 11 passes through the air flow paths 10d, 10f, and 10g, and is pumped to the pressure accumulation tank 13 to be stored therein. That is, the pressure accumulation tank 13 stores the compressed air and accumulates it as energy. The compressed air passes through the heat exchanger 12 before being pumped to the pressure accumulation tank 13.

During the charging operation, the heat medium at a low temperature stored in the low-temperature heat medium tank 22 is sent, by the pump 23b, to the heat exchanger 12 after passing through the heat medium flow path 20b. The high-temperature heat medium after the heat exchange in the heat exchanger 12 is sent, by the pump 23a, to the high-temperature heat medium tank 21 after passing through the heat medium flow path 20a.

The compressed air discharged from the high-pressure port 11b of the compressor/expander combined machine 11 is heated by the compression heat generated during compression. In the heat exchanger 12, the compressed air is cooled and the heat medium is heated by heat exchange between the heat medium and the compressed air. Therefore, the compressed air cooled by the heat exchange in the heat exchanger 12 is stored in the pressure accumulation tank 13. At this time, it is preferable that the compressed air is cooled to about normal temperature. In addition, the heat medium heated by the heat exchange in the heat exchanger 12 is stored in the high-temperature heat medium tank 21.

When the CAES power generation device 1 performs the charging operation, the compressed air sent out from the pressure accumulation tank 13 is supplied to the high-pressure port 11b of the compressor/expander combined machine 11 after passing through the air flow paths 10g, 10e, and 10d. The compressed air passes through the heat exchanger 12 before being supplied to the compressor/expander combined machine 11. The compressed air supplied to the high-pressure port 11b allows the compressor/expander combined machine 11 to operate as an expander, and the motor/generator combined machine 14 is driven as a generator. The power generated by the motor/generator combined machine 14 is supplied to the power system 3. The air expanded by the compressor/expander combined machine 11 is exhausted from the low-pressure port 11a through the air flow paths 10a and 10c.

During the power generation operation, the high-temperature heat medium stored in the high-temperature heat medium tank 21 is sent, by the pump 23a, to the heat exchanger 12 after passing through the heat medium flow path 20a. The heat medium at a low temperature, generated by the heat exchange in the heat exchanger 12, is sent, by the pump 23b, to the low-temperature heat medium tank 22 after passing through the heat medium flow path 20b.

In the compressor/expander combined machine 11, the temperature of the air drops due to heat absorption during expansion. Therefore, it is preferable that the compressed air supplied to the compressor/expander combined machine 11 has a high temperature. In the heat exchanger 12, the compressed air is heated and the heat medium is cooled by the heat exchange between the heat medium and the compressed air. Therefore, the compressed air heated by the heat exchange in the heat exchanger 12 is supplied to the compressor/expander combined machine 11. In addition, the heat medium cooled by the heat exchange in the heat exchanger 12 is stored in the low-temperature heat medium tank 22.

According to the CAES power generation device 1 of the present embodiment, the compressor/expander combined machine 11 in which a compressor and an expander are integrated is used in the CAES power generation device 1, so that the entire device can be reduced in size. In addition, the number of parts to be maintained can be reduced, so that maintenance cost can be reduced, cost for various construction including piping construction can be reduced, and an installation space can be reduced. Therefore, cost can be reduced.

In addition, the lubricant labyrinth seal 11g2 having a suitable shape as described above is adopted in the compressor/expander combined machine 11, so that a fluid other than air, such as a lubricant, existing outside the compression chamber R1, can be suppressed from entering the compression chamber R1. In the compressor/expander combined machine 11, the rotating shaft member 11f rotates in both directions, not in one direction. That is, a direction in which the rotating shaft member 11f rotates when the compressor/expander combined machine 11 functions as a compressor is different from a direction in which the rotating shaft member 11f rotates when the compressor/expander combined machine 11 functions as an expander. When these functions are switched, the rotating shaft member 11f is reversed. Therefore, the shaft seal structure of the compressor/expander combined machine 11 is required to be designed to not depend on the rotation direction. If a viscoseal of a screw groove type (i.e., a spiral type) depending on the rotation direction is provided, an airflow going from the outside of the compression chamber R1 toward the compression chamber R1 may be caused in the through hole 11c depending on the rotation direction. In the configuration of the present embodiment, the lubricant labyrinth seal 11g2 having a rotationally axisymmetric shape so as not to depend on the rotation direction of the rotating shaft member 11f is adopted, so that occurrence of the airflow can be suppressed.

In addition, the lubricant labyrinth seal 11g2 using the compressed air supplied to the compression chamber R1 from the air source 11l via the inlet 11k2 can suppress a lubricant from entering the compression chamber R2, so that a sealing property can be enhanced without depending on the rotation direction of the rotating shaft member 11f. In addition, two or more of the air ring seals 11g1 can suppress the compressed air introduced from the air source 11l via the inlet 11k2 from entering the compression chamber R1, so that the sealing property can be further enhanced.

In addition, the lip seals 14g and 14h having a suitable shape as described above are adopted in the motor/generator combined machine 14, so that a fluid other than air, such as a lubricant, existing outside the coil chamber R2, can be suppressed from entering the coil chamber. In the motor/generator combined machine 14, the rotating shaft member 14f rotates in both directions, not in one direction. That is, a direction in which the rotating shaft member 14f rotates when the motor/generator combined machine functions as an electric motor is different from a direction in which the rotating shaft member 14f rotates when the motor/generator combined machine 14 functions as a generator. When these functions are switched, the rotating shaft member 14f is reversed. Therefore, a shaft seal structure of the motor/generator combined machine 14 is required to be designed to not depend on the rotation direction. If a lip seal of a screw groove type (i.e., a spiral type) depending on the rotation direction is provided, an airflow going from the outside of the coil chamber R2 toward the coil chamber R2 may be caused in the through holes 14a and 14b depending on the rotation direction. In the configuration of the present embodiment, the lip seals 14g and 14h having a rotationally axisymmetric shape so as not to depend on the rotation direction of the rotating shaft member 14f are adopted, so that occurrence of the airflow can be suppressed.

In addition, the pressure of the coil chamber R2 can be increased by supplying compressed air to the coil chamber R2 from the air source 14m via the inlet 14k. Since the coil chamber R2 has a higher pressure than the surroundings, a fluid other than air, such as a lubricant, can be suppressed from entering the coil chamber R2.

In addition, the air flow paths 10b, 10c, 10e, and 10f respectively having the check valves 16a to 16d are provided, so that the flow directions of air can be mechanically switched without performing electromagnetic control. The flow directions of air are opposite between when the compressor/expander combined machine 11 operates as a compressor and when it operates as an expander. If an electromagnetic control part, such as a three-way solenoid valve, capable of switching flow directions, is used, the flow directions can be switched by electromagnetic control, but a structure and associated control become complicated. On the other hand, in the configuration of the present embodiment, mechanical simple switching of the flow directions of air that does not require electromagnetic control is realized by providing two routes (air flow paths 10b and 10c or air flow paths 10e and 10f) in each of which an inflow direction is defined.

In addition, the heat medium flow path system 20 is provided, so that heat can be recovered from the compressed air, heated by the compression heat during compression, by the heat medium in the heat exchanger 12, and the heat can be stored in the high-temperature heat medium tank 21 as thermal energy. When the high-temperature heat medium stored in the high-temperature heat medium tank 21 supplies heat to the heat exchange part during expansion, the heat is given from the heat medium to the compressed air before expansion, which enables expansion efficiency to be improved.

In addition, the pressures of the heat media in the high-temperature heat medium tank 21 and the low-temperature heat medium tank 22 are equalized, so that the flow of the heat medium can be stabilized. In particular, water is used as the heat medium, so that the CAES power generation device 1 excellent in environmental properties can be manufactured at low cost. However, when the heat medium is water, the water boils at 100° C. or higher under atmospheric pressure, so that in order to suppress the boiling of the water, N2 gas at a predetermined pressure is supplied from the N2 cylinder 31.

In addition, the pinion 11i can be suppressed from loosening by the anti-loosening nut 11j. The anti-loosening nut 11j has a function of not loosening by a wedge effect even when the rotating shaft member 11f rotates forward and backward.

Second Embodiment

A CAES power generation device 1 of the present embodiment illustrated in FIGS. 6 to 10 is different from that of the first embodiment in a fixing method using an anti-loosening nut 11j. Except for a configuration related thereto, other configurations are substantially the same as those of the CAES power generation device 1 of the first embodiment. Therefore, the same portions as the configurations described in the first embodiment are denoted by the same symbols, and description thereof will be omitted.

Figure 6:
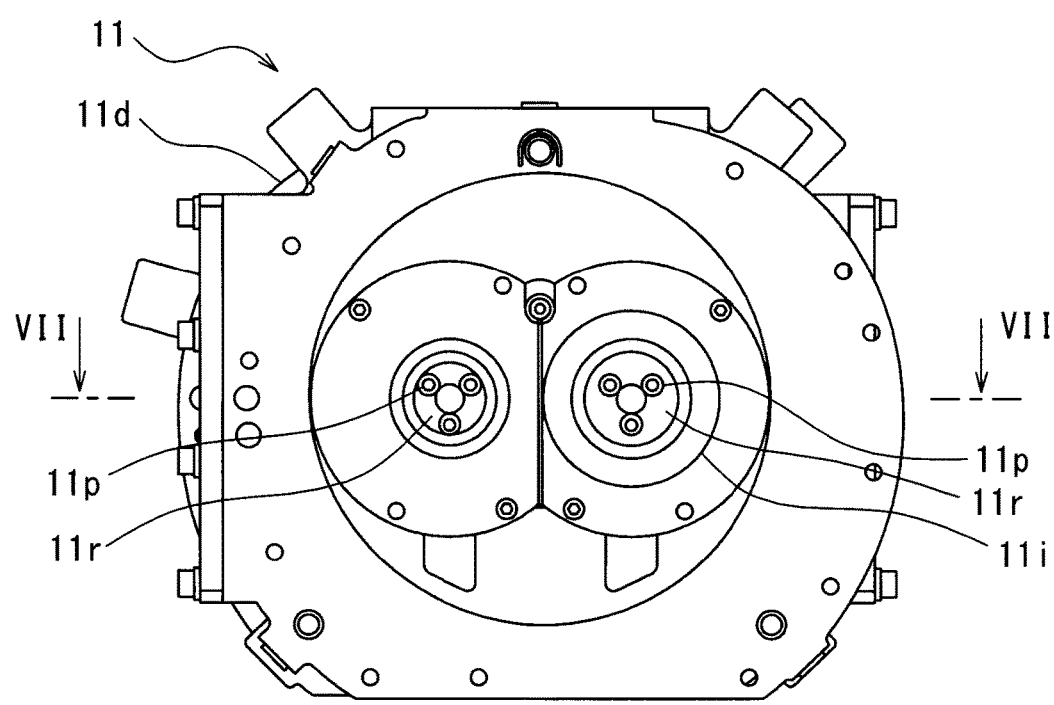
FIG. 6 is a front view of a compressor/expander combined machine of a compressed air energy storage power generation device according to a second embodiment.
Figure 7:
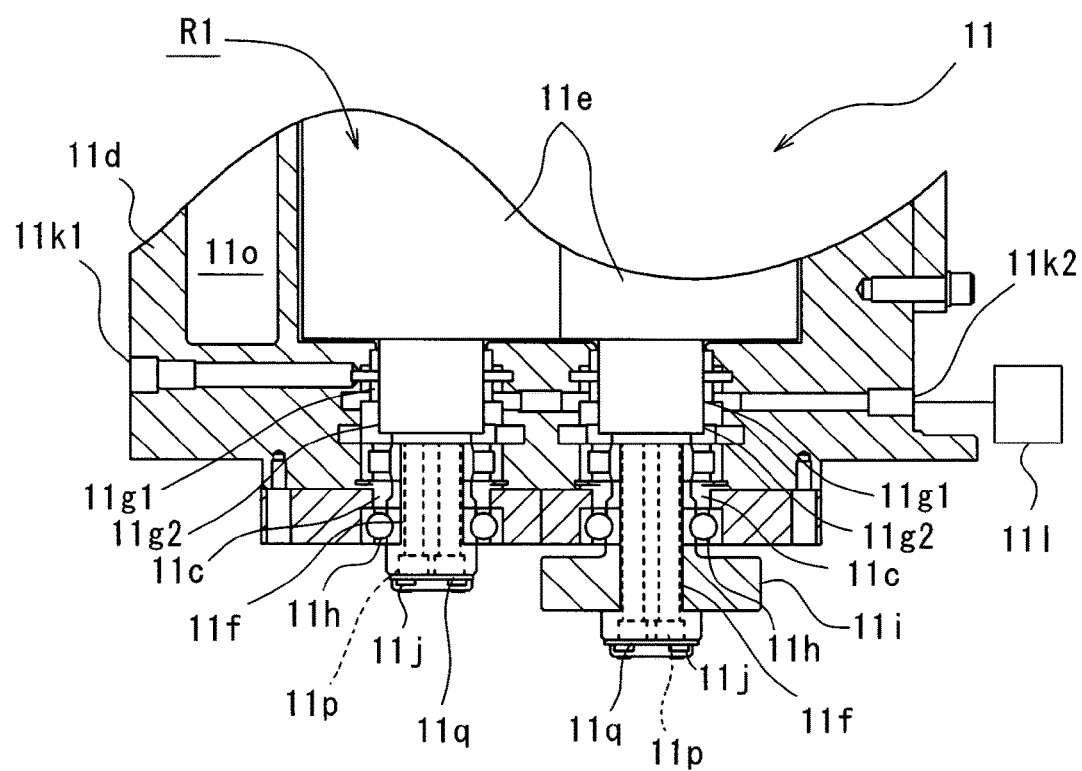
FIG. 7 is a cross-sectional view taken along line VII-VII of FIG. 6.
Figure 8:
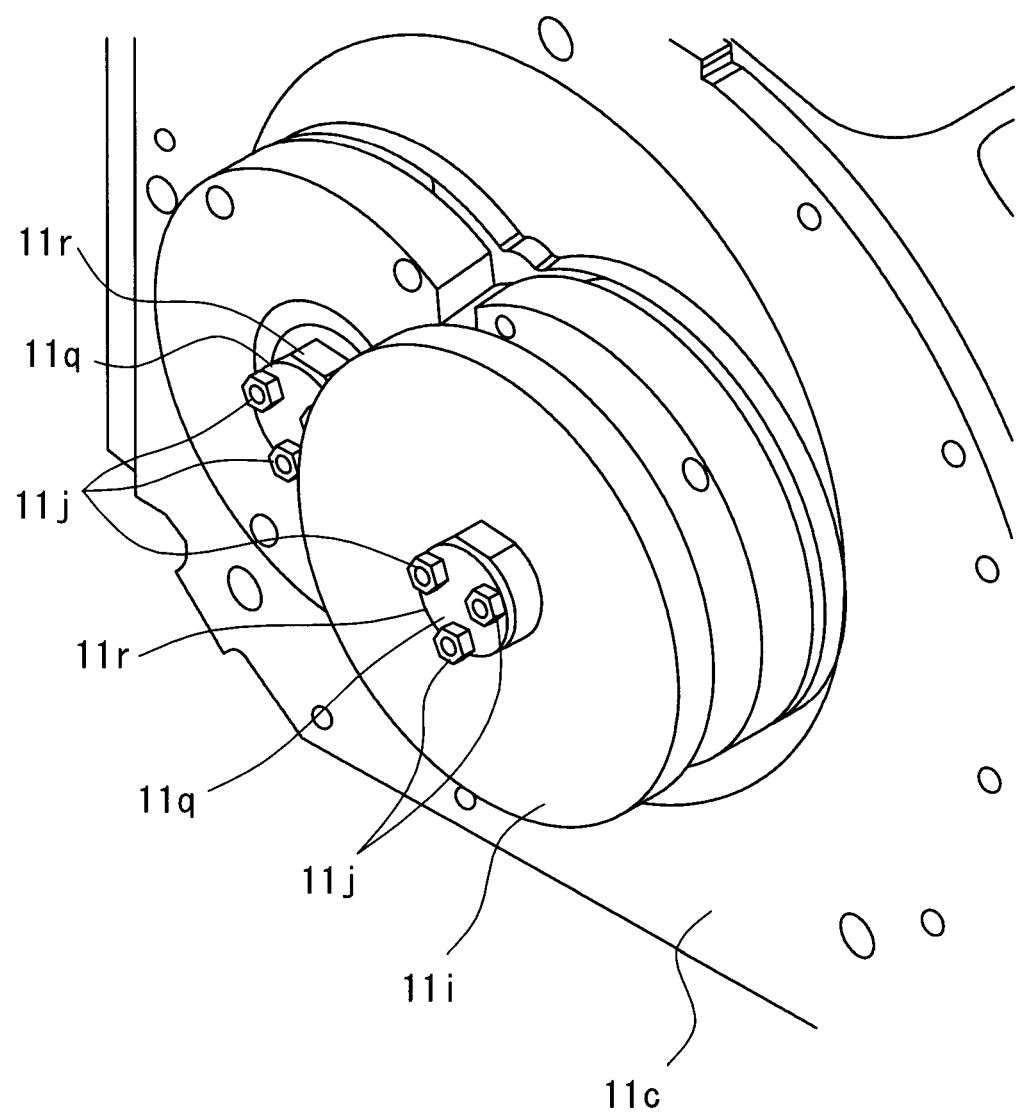
FIG. 8 is a perspective view of a pinion portion of FIG. 7.
Figure 9:
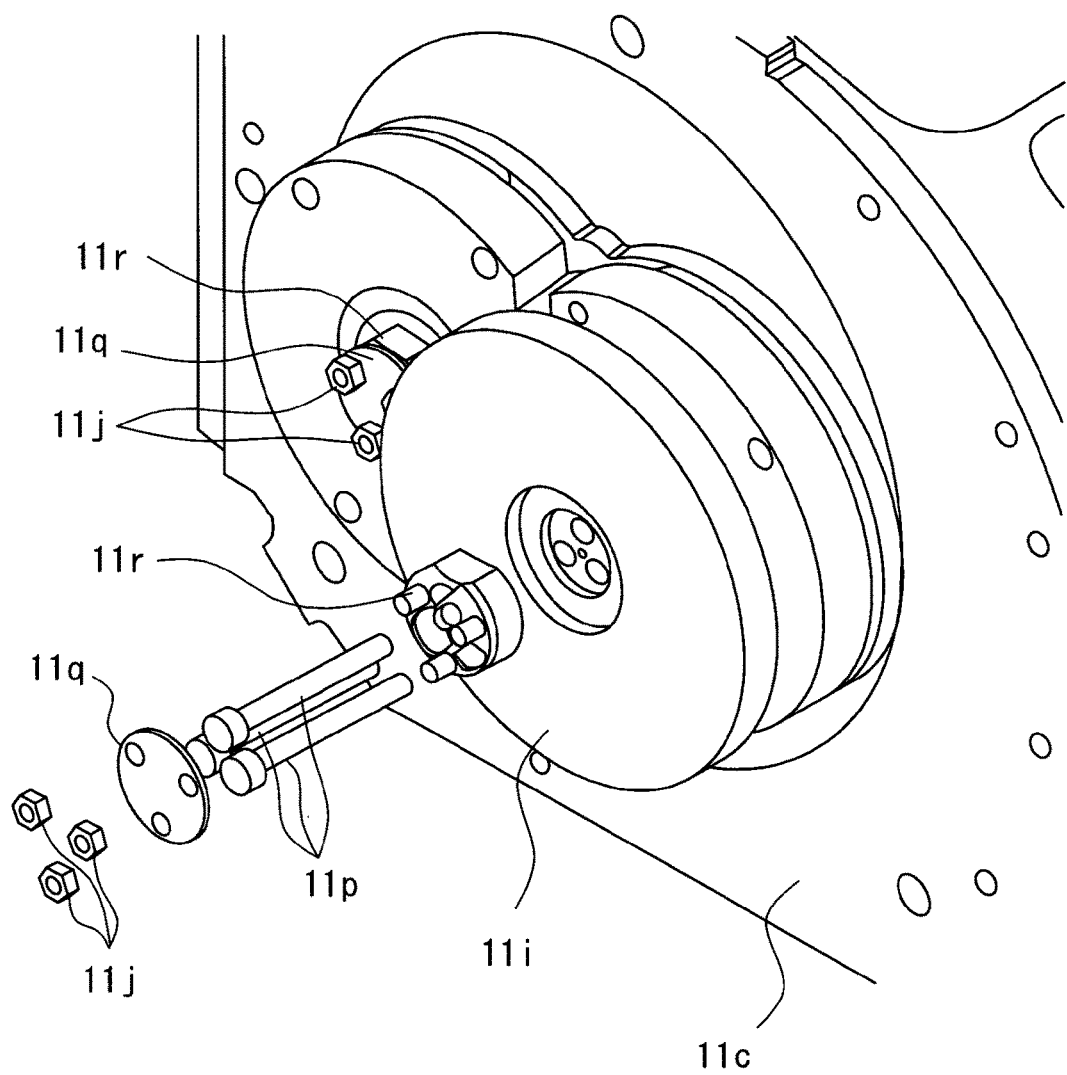
FIG. 9 is an exploded perspective view of the pinion portion of FIG. 7.
Figure 10:
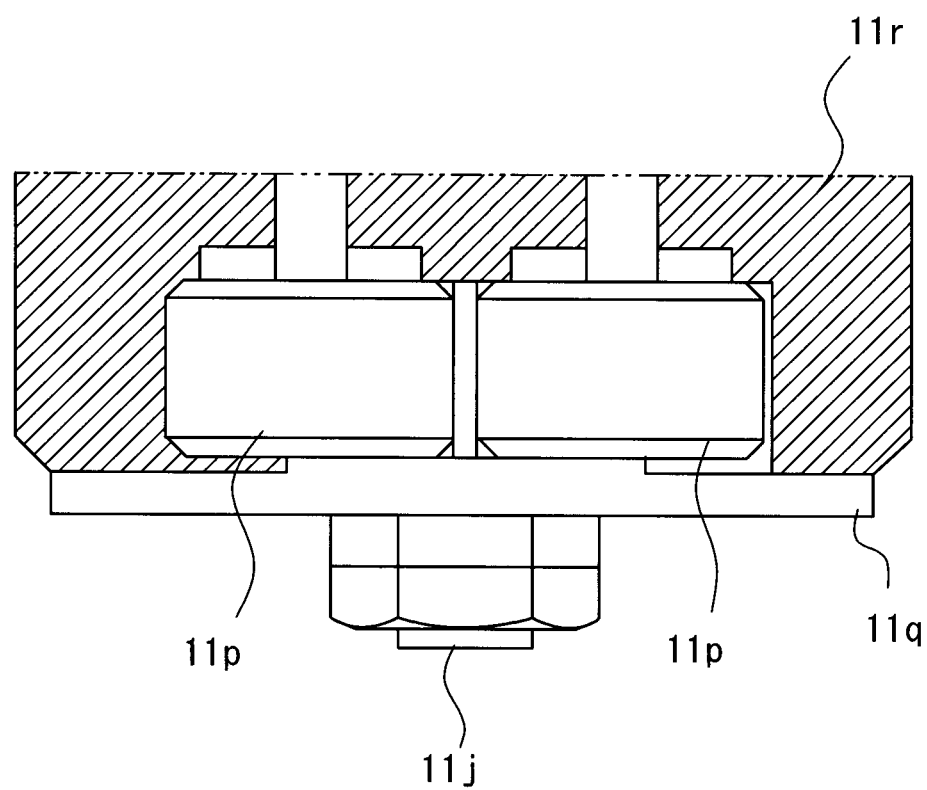
FIG. 10 is an enlarged view of a hexagon socket head bolt portion of FIG. 7.

With reference to FIGS. 6 to 10, in the present embodiment, a pinion 11i is rotatably held by three hexagon socket head bolts (bolts) 11p via a fastener 11r. The hexagon socket head bolt 11p is pressed from the outside by a pressing lid 11q. The pressing lid 11q is fixed by the anti-loosening nut 11j. Note that FIG. 6 illustrates a state in which the pressing lids 11q and the anti-loosening nuts 11j are removed.

According to the present embodiment, the pressing lid 11q for pressing the hexagon socket head bolt 11p is fixed by the anti-loosening nut 11j, so that the pressing lid 11q can be suppressed from loosening and the hexagon socket head bolt 11p can be suppressed from loosening. Therefore, the pinion 11i can be suppressed from loosening.

Although specific embodiments of the present invention have been described above, the present invention is not limited to the embodiments, and various modifications can be made within the scope of the present invention. In addition, the drawings are schematic, and dimensions and fine shapes may be different from those of actual ones.

The invention claimed is:

1. A compressed air energy storage power generation device comprising:
   a compressor/expander combined machine that is of displacement type and has a function as a compressor for compressing air and a function as an expander for expanding compressed air;
   a motor/generator combined machine that is mechanically connected to the compressor/expander combined machine and has a function as an electric motor for driving the compressor/expander combined machine and a function as a generator driven by the compressor/expander combined machine; and
   a pressure accumulator that is fluidly connected to the compressor/expander combined machine and stores compressed air generated by the compressor/expander combined machine, wherein
   the compressor/expander combined machine includes
   a first casing that defines a compression chamber and is provided with a first through hole,
   a first rotating shaft member that is inserted through the first through hole, and
   a first seal part that seals a gap between the first rotating shaft member and the first casing in the first through hole; and
   the first seal part includes
      a lubricant labyrinth seal having a rotationally axisymmetric shape so as not to depend on a rotation direction of the first rotating shaft member, and
      two or more of air ring seals disposed, in a direction in which the first rotating shaft member extends, closer to the compression chamber than the lubricant labyrinth seal; and
   the compressor/expander combined machine further includes
      a first inlet that is provided in the first casing and introduces compressed air into the lubricant labyrinth seal, and
      a first air source that is fluidly connected to the first inlet and supplies compressed air to the lubricant labyrinth seal from the compression chamber side via the first inlet.

2. The compressed air energy storage power generation device according to claim 1, wherein:
   the motor/generator combined machine includes
   a second casing that defines a coil chamber and is provided with a second through hole,
   a second rotating shaft member that is inserted through the second through hole, and
   a second seal part that seals a gap between the second rotating shaft member and the second casing in the second through hole; and
   the second seal part has a rotationally axisymmetric shape so as not to depend on a rotation direction of the second rotating shaft member.

3. The compressed air energy storage power generation device according to claim 2, wherein
   the motor/generator combined machine further includes
   a second inlet that is provided in the second casing and introduces compressed air into the coil chamber, and
   a second air source that is fluidly connected to the second inlet and supplies compressed air into the coil chamber from the second inlet.

4. The compressed air energy storage power generation device according to claim 1, further comprising:
   an inflow path having a check valve that is disposed to allow air to flow only in an inflow direction into the compressor/expander combined machine; and
   a discharge path having a check valve that is disposed to allow air to flow only in a discharge direction from the compressor/expander combined machine.

5. The compressed air energy storage power generation device according to claim 1, further comprising:
   a heat exchange part that is disposed on a high-pressure side of the compressor/expander combined machine and has a function of exchanging heat between the compressed air generated by the compressor/expander combined machine and a heat medium to heat the heat medium and cool the compressed air, and a function of exchanging heat between the compressed air supplied to the compressor/expander combined machine and the heat medium to cool the heat medium and heat the compressed air;
   a high-temperature heat storage part that is fluidly connected to the heat exchange part and stores the heat medium heated by the heat exchange part;
   a low-temperature heat storage part that is fluidly connected to the heat exchange part and stores the heat medium cooled by the heat exchange part; and
   a pressure equalizing part that equalizes pressures of the high-temperature heat storage part and the low-temperature heat storage part.

6. The compressed air energy storage power generation device according to claim 5, wherein:
   the heat medium is water; and
   the pressure equalizing part includes
   a flow path that fluidly connects the high-temperature heat storage part and the low-temperature heat storage part, and
   an inert gas source that is fluidly connected to the high-temperature heat storage part and the low-temperature heat storage part and supplies an inert gas at a predetermined pressure to the high-temperature heat storage part and the low-temperature heat storage part.

7. The compressed air energy storage power generation device according to claim 1, wherein
   the compressor/expander combined machine further includes
   a pinion that is for transmitting rotational driving force with the motor/generator combined machine, and
   an anti-loosening nut that holds the pinion so as not to loosen.

8. The compressed air energy storage power generation device according to claim 1, wherein
   the compressor/expander combined machine further includes
   a pinion that is for transmitting rotational driving force with the motor/generator combined machine,
   a plurality of bolts that hold the pinion,
   pressing lids that press the plurality of bolts, and
   an anti-loosening nut that fixes the pressing lid.

* * * * *